US010586026B2

(12) United States Patent
Zvenigorodsky

(10) Patent No.: US 10,586,026 B2
(45) Date of Patent: Mar. 10, 2020

(54) SIMPLE OBFUSCATION OF TEXT DATA IN BINARY FILES

(71) Applicant: ELECTRONIC ARTS INC., Redwood City, CA (US)

(72) Inventor: Alex Zvenigorodsky, Redwood City, CA (US)

(73) Assignee: Electronic Arts Inc., Redwood City, CA (US)

( * ) Notice: Subject to any disclaimer, the term of this patent is extended or adjusted under 35 U.S.C. 154(b) by 232 days.

(21) Appl. No.: 15/172,891

(22) Filed: Jun. 3, 2016

(65) Prior Publication Data

US 2017/0351847 A1    Dec. 7, 2017

(51) Int. Cl.
| | |
|---|---|
| G06F 21/14 | (2013.01) |
| G06F 21/54 | (2013.01) |
| G06F 21/12 | (2013.01) |
| G06F 21/62 | (2013.01) |
| G06F 8/41 | (2018.01) |

(52) U.S. Cl.
CPC ............... *G06F 21/14* (2013.01); *G06F 8/423* (2013.01); *G06F 21/125* (2013.01); *G06F 21/54* (2013.01); *G06F 21/6209* (2013.01); *G06F 2221/033* (2013.01)

(58) Field of Classification Search
CPC ....................................................... G06F 21/14
USPC ........................................................ 713/190
See application file for complete search history.

(56) References Cited

U.S. PATENT DOCUMENTS

| | | | | |
|---|---|---|---|---|
| 7,003,800 B1* | 2/2006 | Bain | ................... | G06F 21/6209 713/183 |
| 7,337,438 B1* | 2/2008 | Dobbins | ................. | G06F 8/425 717/141 |
| 7,430,670 B1* | 9/2008 | Horning | ................... | G06F 21/14 713/190 |
| 8,424,090 B2* | 4/2013 | Kang | ..................... | G06F 21/53 713/188 |
| 8,433,906 B2* | 4/2013 | Jamjoom | ............ | G06F 21/6218 705/52 |
| 8,539,459 B2* | 9/2013 | Stiemens | ................ | G06F 21/14 713/190 |
| 8,874,928 B2* | 10/2014 | Betouin | ................ | G06F 21/125 713/189 |
| 2005/0183072 A1* | 8/2005 | Horning | .................. | G06F 21/14 717/140 |
| 2009/0103726 A1* | 4/2009 | Ahmed | ................. | H04L 9/0668 380/46 |
| 2010/0325446 A1* | 12/2010 | Mordetsky | ............ | G06F 21/125 713/190 |
| 2012/0124372 A1* | 5/2012 | Dilley | ................ | H04L 67/2819 713/162 |

* cited by examiner

*Primary Examiner* — Peter C Shaw
(74) *Attorney, Agent, or Firm* — Lowenstein Sandler LLP

(57) ABSTRACT

An obfuscation macro can expand obfuscation identification information into a data value during or prior to compiling source code, and insert a de-obfuscation call where the data value is referenced in the source code. An obfuscation utility can scan compiled binaries for data values containing obfuscation identification information. The obfuscation utility identifies and obfuscates data values containing obfuscation identification information within the compiled binaries. The de-obfuscation call de-obfuscates obfuscated data values during runtime.

18 Claims, 10 Drawing Sheets

```
string sTestString = "This is a test string for obfuscation.";
string sTestString2 = "Here's another string for obfuscation.";
string sTestString3 = "And here's a third.";
```
201

```
            0  1  2  3  4  5  6  7  8  9  a  b  c  d  e  f
03af3ac0h:  64 6F 77 6E 6C 6F 61 64 69 6E 67 20 77 68 69 6C  ; downloading whil
03af3ad0h:  65 20 69 6E 20 44 6F 77 6E 6C 6F 61 64 65 72 20  ; e in Downloader
03af3ae0h:  53 61 66 65 20 4D 6F 64 65 2E 00 00              ; Safe Mode...
03af3af0h:
03af3b00h:
03af3b10h:
03af3b20h:
03af3b30h:
03af3b40h:                                            00 00 ;
03af3b50h:  C4 C0 D8 14 C5 97 9B 10 BA 7C 99 10 F8 C9 9A 10  ; ÄÀØ.Å—›.º|™.øÉš.
03af3b60h:  6A 21 9A 10 4F 65 99 10 65 25 9B 10 69 07 9C 10  ; j!š.Oe™.e%›.i.œ.
```
202

FIG. 2A

```
#define OBFUSCATE_STRING(x)
std::string(Service::ObfuscationLibrary::deobfuscate("OB_START" x "OB_END").c_str();
```

SIMPLE OBFUSCATION OF TEXT DATA IN BINARY FILES

BACKGROUND

Computer hackers often scan executable binary files of software applications for plain text data. Usually, plain text data appearing in software binaries originates in the source code and could contain sensitive information such as, but not limited to, hardware IDs, network addresses, and network location identifiers. If obtained by a hacker, the plain text data containing sensitive information can be used to exploit a server and retrieve confidential information.

SUMMARY OF EMBODIMENTS

The systems, methods, and devices of this disclosure each have several innovative aspects, no single one of which is solely responsible for the all of the desirable attributes disclosed herein.

One embodiment discloses a system, the system comprising an electronic data store configured to store source code and compiled binary code of a software application; and a hardware processor in communication with the electronic data store, the hardware processor configured to execute specific computer-executable instructions to at least; access a pre-defined obfuscation macro residing in source code on the electronic data store; prior to or during compiling of the source code on the electronic data store into binary code, execute the macro to insert, within the source code, obfuscation identification information to a data value and at least one runtime de-obfuscation function call associated with the data value in the source code; compile the source code into binary code, wherein the binary code preserves the data value including obfuscation identification information in unobfuscated form; after compiling the source code, identify, by an obfuscation utility, the unobfuscated data value containing obfuscation identification in the binary code; and obfuscate, by the obfuscation utility, the unobfuscated data value in the binary code into an obfuscated data value, wherein execution of the binary code executes the at least one runtime de-obfuscation function call to de-obfuscate the obfuscated data value.

Another embodiment discloses a method, as implemented by a computing device comprising a hardware processor configured with specific computer-executable instructions, comprising accessing, by the hardware processor, a pre-defined obfuscation macro residing in source code on the electronic data store; executing, by the hardware processor, the macro to insert, into the source code, obfuscation identification information to a data value and at least one runtime de-obfuscation function call associated with the data value in the source code, wherein execution of the macro occurs prior to, or during, compiling of the source code to a binary code; compiling, by the hardware processor, the source code into the binary code, wherein the binary code preserves the data value comprising obfuscation identification in unobfuscated form; identifying, by an obfuscation utility executed on the hardware processor, after compiling the source code, the data value matching obfuscation identification in the binary code; and obfuscating, by the obfuscation utility executed on the hardware processor, the data value in the binary code into an obfuscated data value, wherein executing the binary code executes the de-obfuscation function to de-obfuscate the obfuscated data value.

Another embodiment discloses a method, as implemented by a computing device comprising a hardware processor configured with specific computer-executable instructions, comprising accessing, by a de-obfuscation function call, a computing device memory location of a data value containing obfuscation identifiers in binary code; identifying, by the de-obfuscation function call, the obfuscation identifiers within the data value at the accessed computing device memory location, removing, by the de-obfuscation function call, obfuscation identifiers from the data value, wherein removing obfuscation identifiers returns an initial data value; in response to not identifying the obfuscation identifiers within the data value, determining, by a de-obfuscation algorithm, an obfuscation key within the obfuscation identifiers of an obfuscated data value; de-obfuscating, by the de-obfuscation algorithm using the obfuscation key, the obfuscated data value; returning, by the de-obfuscation function call, the unobfuscated data value, wherein the returned unobfuscated data value does not contain the obfuscation identifiers.

Although certain embodiments and examples are disclosed herein, inventive subject matter extends beyond the examples in the specifically disclosed embodiments to other alternative embodiments and/or uses, and to modifications and equivalents thereof.

BRIEF DESCRIPTION OF THE DRAWINGS

Throughout the drawings, reference numbers are re-used to indicate correspondence between referenced elements. The drawings are provided to illustrate embodiments of the subject matter described herein and not to limit the scope thereof.

FIG. 2A illustrates an embodiment of the compiled text data found in a binary file.

FIG. 2B illustrates an embodiment of the obfuscation macro.

FIG. 2C illustrates an embodiment of declaring text data with a macro and the resulting pre and post obfuscated binary file.

DETAILED DESCRIPTION

Figure 1A:
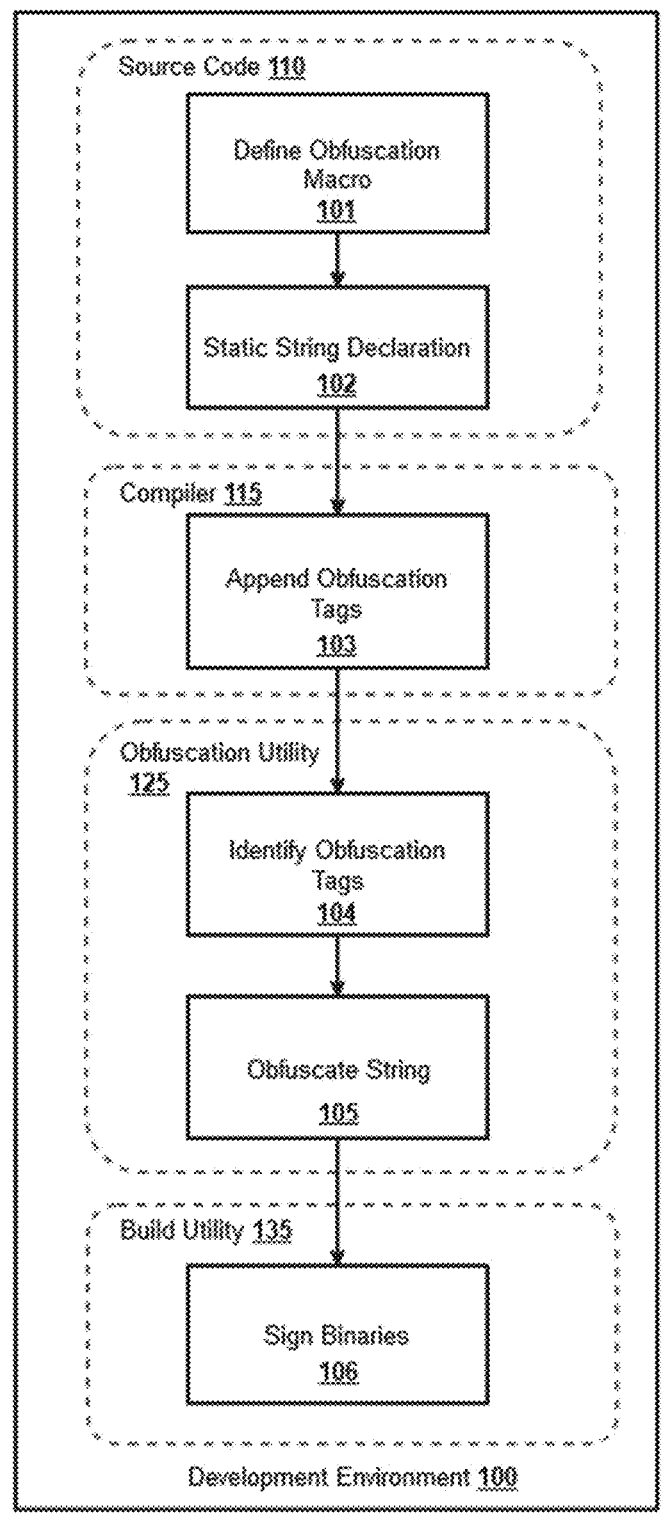
FIG. 1A illustrates an embodiment of the obfuscation process.

Software developers often employ various security techniques (e.g., encryption, digital signatures, and the like) to protect published software (e.g., downloadable and physically distributed software applications, software patches, media, video games, mobile applications, and the like). A conventional method of protecting plain text data in executable binary files is to transform it into seemingly randomized characters, commonly known as obfuscation. By creating a cipher that is computationally expensive to decipher, code obfuscation deters unwanted parties from discovering sensitive information in plain text data within a software application, typically stored within the executable files.

If not obfuscated, the sensitive plain text data will ultimately compile into the executable files of an application in an unsecure manner, leaving sensitive information exposed. This makes it imperative that software developers obfuscate plain text data within source code files in an effort to provide a preventive security measure to the executable files of a published software application.

One naïve solution for obfuscating sensitive plain text data in a binary uses a standalone application that allows a programmer to paste in a string data type and outputs an obfuscated version of that string. The programmer embeds the generated obfuscated string, using the traditional "copy-paste" method, into the source code file of a software application undergoing development within a development environment. Thus, when the data is compiled into the binary, it will not appear as plain text. Instead, the obfuscated version of the string data in the binary.

However, such embedded obfuscated strings are difficult for software developers to work with as they appear in source code to be a set of randomized characters. For example, should the need arise to reference an the plain text version of the obfuscated string, the software developer must use the same application to de-obfuscate the obfuscated string by once again using the "copy-paste" method to retrieve the initial string data type value. There are other limitations as well. For example, it becomes difficult to search one or multiple source code files written by the developer based on the un-obfuscated version of the plain text data. It also is difficult to change the value of the plain text data in the source without again using the same obfuscation application. Overall, this type of obfuscation technique is problematic to software developers because it prolongs the development process of a software application by hindering the rate at which a software developer is able to interact with obfuscated text data within source code files.

Overview

One solution to this problem is to use a macro (which may be a traditional C/C++ macro or any other precompile process for any language) defined within source code to perform the obfuscation of the plain text data automatically, but after the software developer has had the chance to manipulate the data directly in the source code. For example, in one embodiment, the macro can append identifiers to any text type data variable (or any other literal, initial, or default value appearing in the source code) that is to be obfuscated before appearing in a published binary. Actual obfuscation may not occur during the precompile or compiling process. Instead, it can be performed by a separate obfuscation utility, thus preserving the ability for a developer to view an unobfuscated version of the data in the pre-published binary or during the debug process.

In one embodiment, the macro can be configured to append text data (in the form of string literals) that serve as identifiers, referenced herein as obfuscation tags or tags, to the beginning and end of a string literal declared within a static string variable that invokes the defined macro (referenced herein as the obfuscation macro) during a precompile or compiling process. An obfuscation utility (which itself can be a completely separate executable from the compiler, or part of the compiler) can identify and obfuscate the tagged strings after the source code is compiled. In some embodiments, the obfuscation macro, can reconfigure source code files, during a precompile or compiling process, to call to a de-obfuscation algorithm required to remove obfuscation tags and possibly de-obfuscate obfuscated strings during runtime.

Embodiments of the present disclosure provide for methods and systems for enabling a software developer to specify which plain text data appearing in source code are to be obfuscated by using a programming language and development environment that supports the use of a configurable precompile process, such as a macro. A development environment, as used within this application, refers to any software (e.g., program, module, service, script, and the like) that provides a desktop environment (commonly known as an IDE) on a computing device for developing any type of software application (e.g., PC application, video game, mobile application, and the like) using one or more programming languages (e.g., C++, C, Java, and the like) to be executed on any single or multiple types of computing platforms (e.g., mobile, desktop, gaming, television, cloud, and the like). Additionally, a development environment, as used within this application, may refer to one or more separate software applications (e.g., text editor, compiler, obfuscation utility, debug utility, build utility, and the like) on a computing device for developing any type of software application (e.g., PC application, video game, mobile application, and the like) using one or more programming languages (e.g., C++, C, Java, and the like) to be executed on any single or multiple types of computing platforms (e.g., mobile, desktop, gaming, television, cloud, and the like). A macro, as used within this application, is any text defined source code manipulation that is interpreted by a compiler or preprocessor, before or during, the actual compiling of the source code.

For purposes of this disclosure the term "client" refers to a published software application downloaded to a computing device, that, when executed, interacts with network based computing services. For purposes of this disclosure the keyword "static" is used to provide a concrete C++ example of limiting a data type variable from reinitializing its text data value during runtime, though various keywords may be used with various data types across a variety of programming languages to specify any type of limitations such as duration, scope, and the like. For purposes of this disclosure the variable "string", as used within our application, refers to a data type variable or constant capable of storing a text data value, though any data type variable with the capacity to store a text data may be used. For purposes of this disclosure the term "string literal", as used within our application, refers text data stored as a string value. For purposes of this disclosure the term "de-obfuscate", as used within our application, refers to reversing the obfuscation process on text data values.

I. String Obfuscation Overview

FIG. 1A is a diagram illustrating an obfuscation process occurring within a development environment 100 in accordance with one embodiment of the present disclosure. In one embodiment, development environment 100 is a software application (IDE) including a compiler 115, an obfuscation utility 125, and a build utility 135 used for the development of software applications, such that the executable binary code for a given software application originates from source code files 110. Source code files 110 are C++ files that can be compiled into an application, such as a computer client application.

In the exemplary embodiment shown in FIG. 1A, a software developer may define (at 101) an obfuscation macro, within source code 110, as a preprocessor directive with routine calls to obfuscation libraries. A developer would use such a macro on any sensitive plain text in a source code file that he wishes to be obfuscated in a public, compiled version of a binary such as signed binary 140 by declaring (at 102) a static string (or any other data type variable or constant capable of containing plain text data) that calls the obfuscation macro and passes plain text data within the parameters. A static string is one example of a data type that may be used in the obfuscation process. For example, numerical data values stored as an integer may also be used if the source code 110 is configured to convert the integer data type and its numerical data value to a string data type that stores the numerical data value as a string literal so that obfuscation tags can be concatenated to the numerical value.

In some embodiments, a compiler 115 prepares source code 110 for runtime execution, however, a software developer may specify what, if any, changes occur to plain text data before the source code is compiled, such as by the C++ preprocessor. During the preprocessor phase, the obfuscation macro is expanded to append (at 103) obfuscation tags to plain text data passed in the static string declaration. After the obfuscation tags have been appended to one or more text data values, a compiler continues its processes to produce compiled binaries 120. In some embodiments, the expansion of the obfuscation macro can occur during the compiling process.

In some embodiments, a separate (or as a part of the compiler, IDE or build utility) obfuscation utility 125 may be configured to identify obfuscation tags (at 104) within static strings and obfuscate (at 105) identified static strings within compiled binaries through read and write operations. For example, the obfuscation utility 125 may identify, during a read operation of the compiled binaries, static strings that a developer wishes to obfuscate by indicating the presence of an obfuscation tag within text data value. The obfuscation utility may also be configured to obfuscate the text data value (and the obfuscation tags appended to the text data value), as a write operation to compiled binaries 130.

In some embodiments, the build utility 135 is collection of processes required to produce a final build of executable binary files for the client application. Build utility 135 may comprise digitally signing (at 106) the compiled binaries to produce a final build of a client application. A digital signature may occur after obfuscation to ensure no alterations have been made to compiled binaries.

To simplify discussion and not limit the present disclosure, blocks 101 and 102 of the obfuscation process are performed manually by a software developer, whereas the remaining blocks (103, 104, 105, and 106) are performed as an automated process by the tools and utilities comprising a development environment 100, however, multiple systems and configurations, that need not be implemented in the exemplified order, may be used to automate, or manually produce, static string obfuscation of text data in compiled binary files.

Figure 1B:
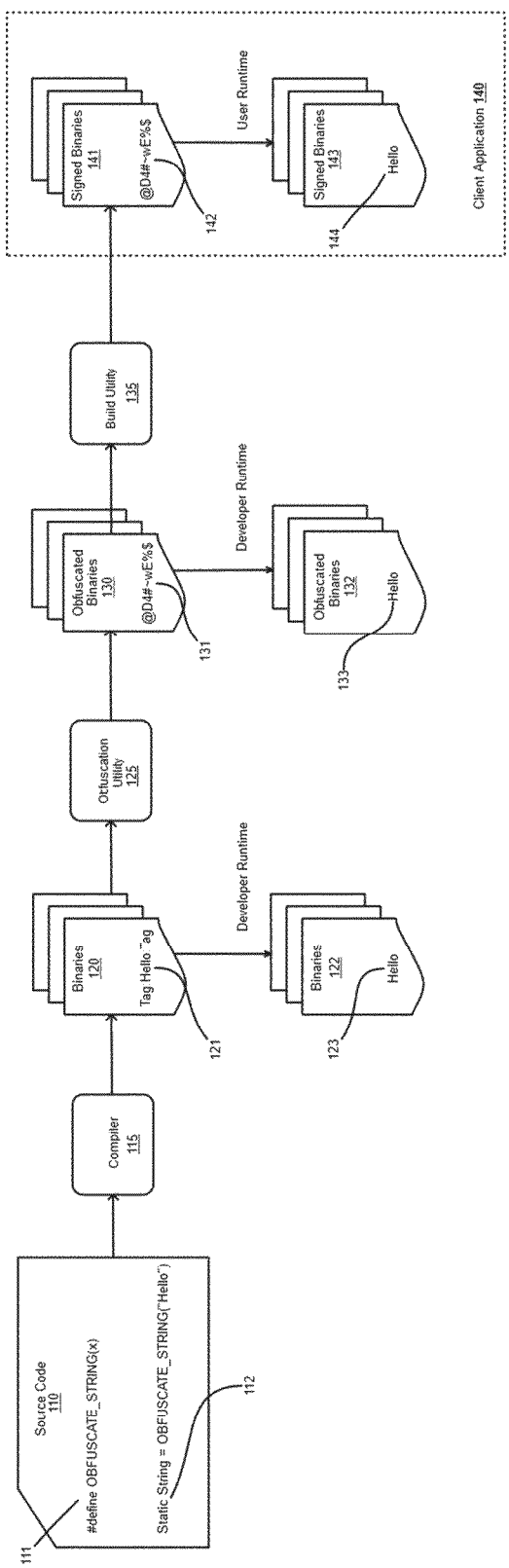
FIG. 1B illustrates an embodiment of source code files compiled within a development environment undergoing de-obfuscation at runtime.

FIG. 1B is a diagram of runtime de-obfuscation occurring within an development environment 100 (IDE) and client application 140 in accordance with one embodiment of the present disclosure.

In the exemplary embodiment shown in FIG. 1B, source code files 110 comprise a defined obfuscation macro "OBFUSCATE_STRING(x)" 111 and a static string declaration 112 that invokes the obfuscation macro 111 with the text data argument "Hello". The obfuscation macro 111 is configured to expand, at the preprocessor phase, into obfuscation tags that concatenate to the beginning and end of the text data value passed in the argument of the static string declaration that invokes the macro 112. The obfuscation macro is also configured to provide source code with routine calls to obfuscation/deobfuscation libraries that provide compiled binaries 120 with a runtime de-obfuscation algorithm that removes obfuscation tags and, if the text data within the static returned is obfuscated, de-obfuscates the text data (referenced herein as de-obfuscation function calls or de-obfuscation calls).

In some embodiments, the compiler 115 compiles source code into executable binaries 120 that comprise concatenated text data "Tag:Hello:Tag" 121 (referenced herein as a tagged string). The binaries 120 also comprise a de-obfuscation algorithm, provided by the obfuscation macro 111, which enable a developer to perform runtime execution. For example, if tagged string 121 is network location identifier and the compiled binaries are executed (at 122), it is paramount to the application that the original text data value be returned (without obfuscation tags) for the network location identifier to be completed, thus a de-obfuscation call is made to remove the obfuscation tags (illustrated in FIG. 1B as "Tag:" and ":Tag") and return the original string value 123 "Hello". The tags themselves can be any arbitrary predetermined tag that is identifiable by an obfuscation utility 125.

In some embodiments, the obfuscation utility 125 is a post process executable tool containing an obfuscation algorithm capable of obfuscating tagged strings 121 in compiled binaries 120 as a write operation, ultimately producing obfuscated binaries 130. The obfuscate binaries 130 also comprise a de-obfuscation algorithm that enables a developer to perform runtime execution. For instance, when obfuscated binaries 130 are executed (at 132) and the obfuscated string 131 is to be returned during runtime, a de-obfuscation call is made to remove obfuscated obfuscation tags and de-obfuscate the obfuscated string 131 to return the original static string literal value 133 "Hello".

In some embodiments, the build utility 135 is collection of processes required to produce a deployable software application. The processes within the build utility 135 may comprise preparing and resolving resources, generating serialization assemblies, and signing binaries. Signing binaries with a digital signature is method for publishers to prove the authenticity of a distributed software application as it ensures that the software code has not been altered since the signature was s to the binaries. For example, the digital signature can be signed to the binaries within the build utility 135 (or outside of the build utility using a separate signing application or process) after text data has been obfuscated. If binaries are signed prior to obfuscation, the signature would be invalid when the text data is obfuscated. A digital signature is one example of authenticating, to a computing device, a software application.

In some embodiments, the build utility 135 builds obfuscated binaries 130 into a client application 140. The client application 140 comprising of signed binaries 141 contains obfuscated text data 142 that automatically de-obfuscates during runtime. For instance, during runtime (at 143) the obfuscated string 142 is returned and a de-obfuscation call is made to remove obfuscated obfuscation tags and de-obfuscate the obfuscated string 142. After the de-obfuscation algorithm is processed on the obfuscated string 142, the original text data value "Hello" 144 is returned.

II. Obfuscation Process

Figure 2C:
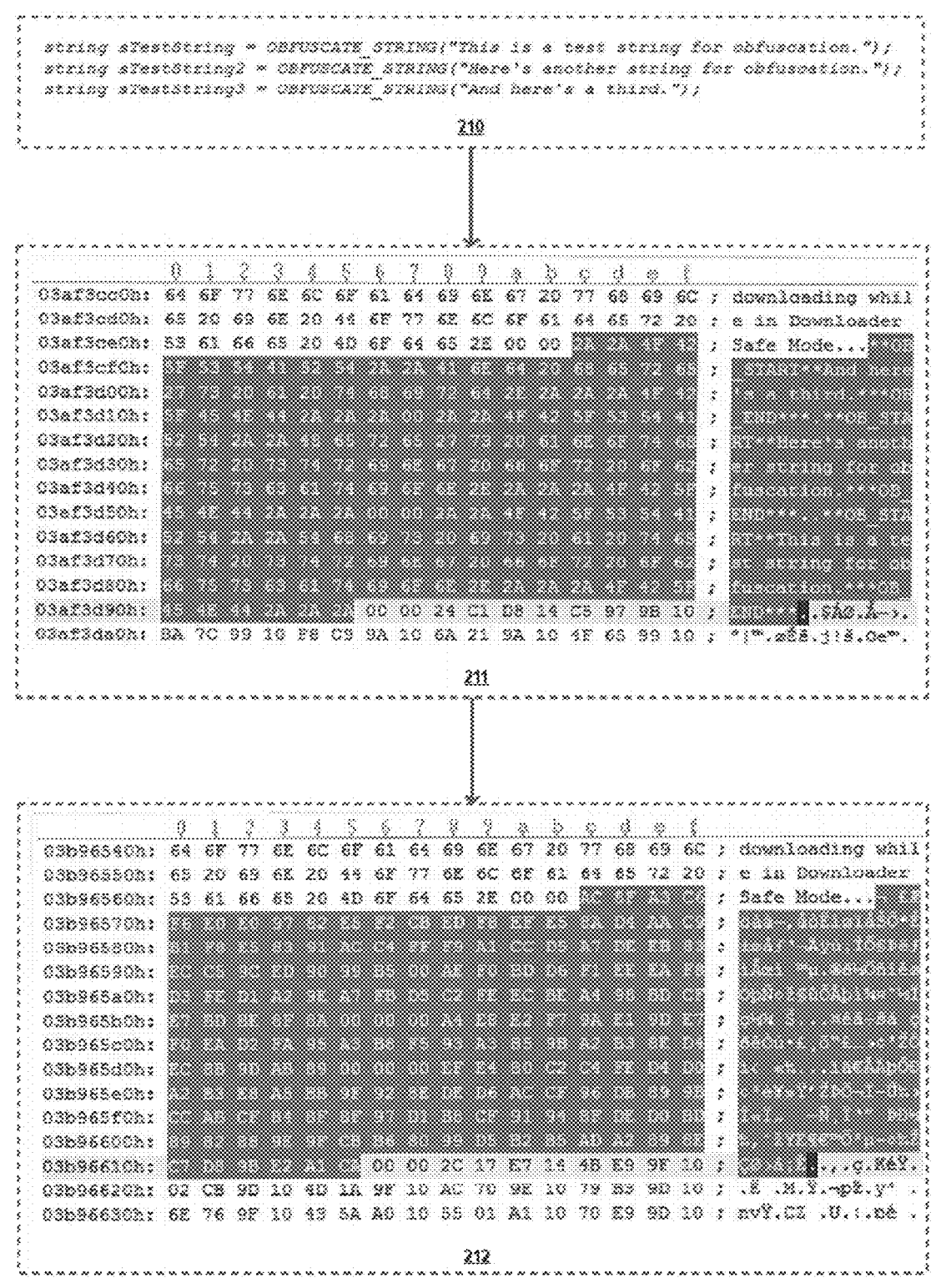

FIG. 2A illustrates how a string would appear in a binary without any obfuscation technique being applied. In contrast, FIG. 2C provides an example embodiment illustrating how the methods and systems described herein might carry out the obfuscation process. In this example, the C++ programming language is used, but similar concepts can be leveraged in other programming languages for the same effect.

With reference now to FIG. 2A, string declarations 201 exemplify standard C++ declarations of string data type variables in source code. The declared variables in 201 are sTestString, sTestString2, and sTestString3, each of which are declared with a unique string literal value. When compiled, these initial values of the string variables are included within a binary file. Binary file snippet 202 illustrates, and highlights, the corresponding hexadecimal values and high level text of the string declarations 201. The string variables 201 have retained their respective string literal values after compile time 202. Consequently, any potential malicious user can find and detect these values without much effort, giving clues on how the malicious user might attack the developer's software or related services.

FIG. 2B exemplifies how an obfuscation macro 111 can be defined in source code. The obfuscation macro 111 is defined (block 205) with a single parameter "x" allowing a string literal value can be passed as an argument when invoked. The passed string literal is given a de-obfuscation routine call (located within a service library) that inserts the string literal "x" between the obfuscation tags "OB_START" and "*OB_END*". Prior to the source code being compiled into executable binary code, the obfuscation macro 111 is executed in the preprocessor, allowing for the obfuscation tags concatenate to the passed string literal. As a result of the executing the macro in the preprocessor, the compiled binary code will contain runtime instructions to execute the de-obfuscation routine calls associated with the tagged string.

FIG. 2C depicts an embodiment of string declarations invoking an obfuscation macro 210 in C++ source code. The declared variables in 210 are sTestString, sTestString2, and sTestString3, each of which are declared with a unique string literal value within the obfuscation macro.

Binary file 211 illustrates, and highlights, the corresponding hexadecimal values and ASCII text data of the string declarations 210. The string variables 210 have been modified in value after compile time 211, each of which have had the obfuscation tags "OB_START" and "*OB_END*" concatenated to the beginning and end of the string value, respectively. Designated as identifiers, the obfuscation tags are vital to automating the obfuscation process, as they declare, to the obfuscation utility 125, the starting and end points of text data that is to be obfuscated. Using a pair of obfuscation tags is one example of identifying specific text data to be obfuscated in an automated manner. For instance, one obfuscation tag may be used to indicate specific text data that is to be obfuscated. By appending an obfuscation tag the beginning of a string and allowing a null space to follow end the string, an obfuscation utility 125 can obfuscate the text data between the obfuscation tag and the null space.

In one embodiment, a compiled binary 211 containing obfuscation tags in its text data can be executed prior to the obfuscation of tagged strings. The obfuscation macro 111 provides the compiled binary 211 with runtime instructions, in the form of de-obfuscation routine calls, to remove the obfuscation tags and return the initial string literal value. A developer may wish to retrieve the initial string literal value of a tagged, and unobfuscated, string during development runtime (the execution of a software application prior to its completion) to perform various testing. If the tagged string contained a network location identifier it would be crucial that the obfuscation tags be removed prior to the application making the connection for the developer to test the application properly. Similarly, it would be beneficial to a development team to utilize the automated return of the initial value of a tagged, and unobfuscated, string when a given developer (from the same or a separate development team) who knows not of obfuscation tags or obfuscation macro 111, is required to test an application.

With the obfuscation tags concatenated to string variables 210 in the compiled binaries 211, the obfuscation utility may now run its process of identifying string variables with obfuscation tags and performing obfuscation. After the obfuscation utility has completed its obfuscation process, an obfuscated version 212 of the compiled binary 211 is created. The obfuscated binary 212 illustrates, and highlights, the corresponding obfuscated hexadecimal values and ASCII-Extended text for the tagged strings.

III Obfuscation Utility

Figure 3A:
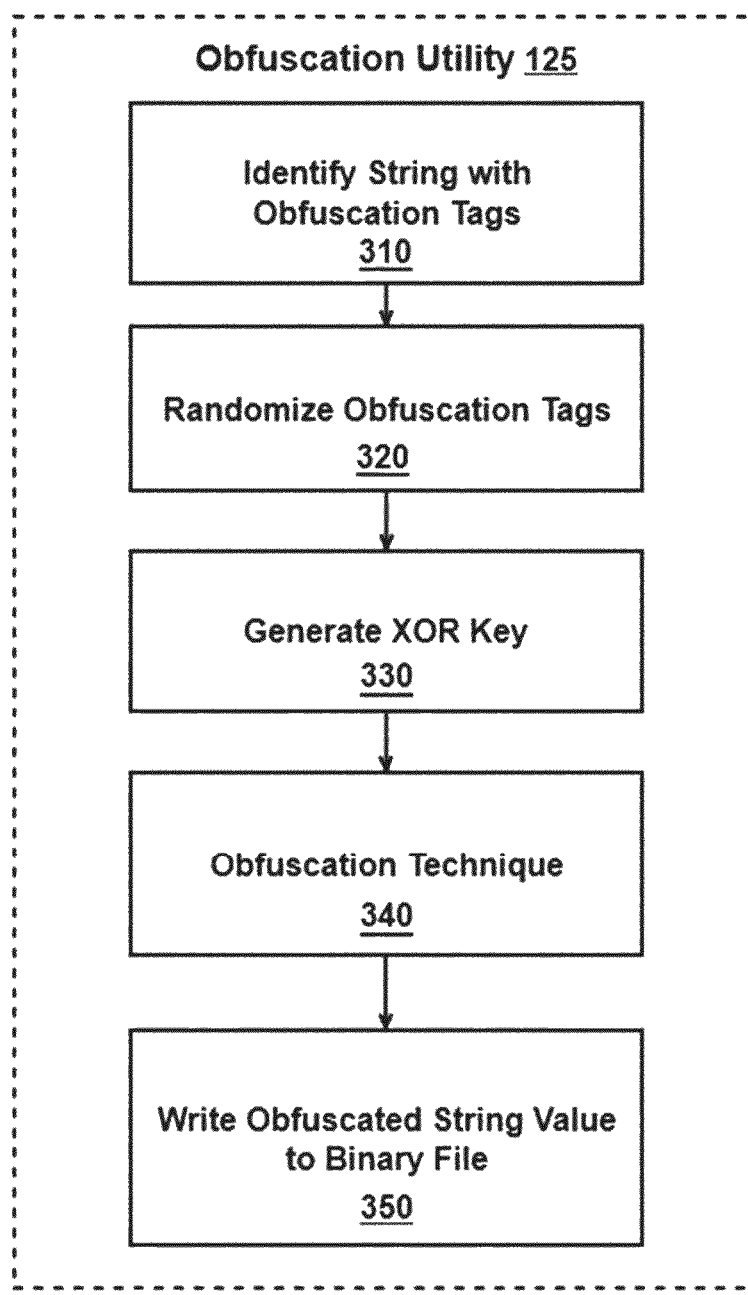
FIG. 3A illustrates an embodiment of an obfuscation utility.
Figure 3B:
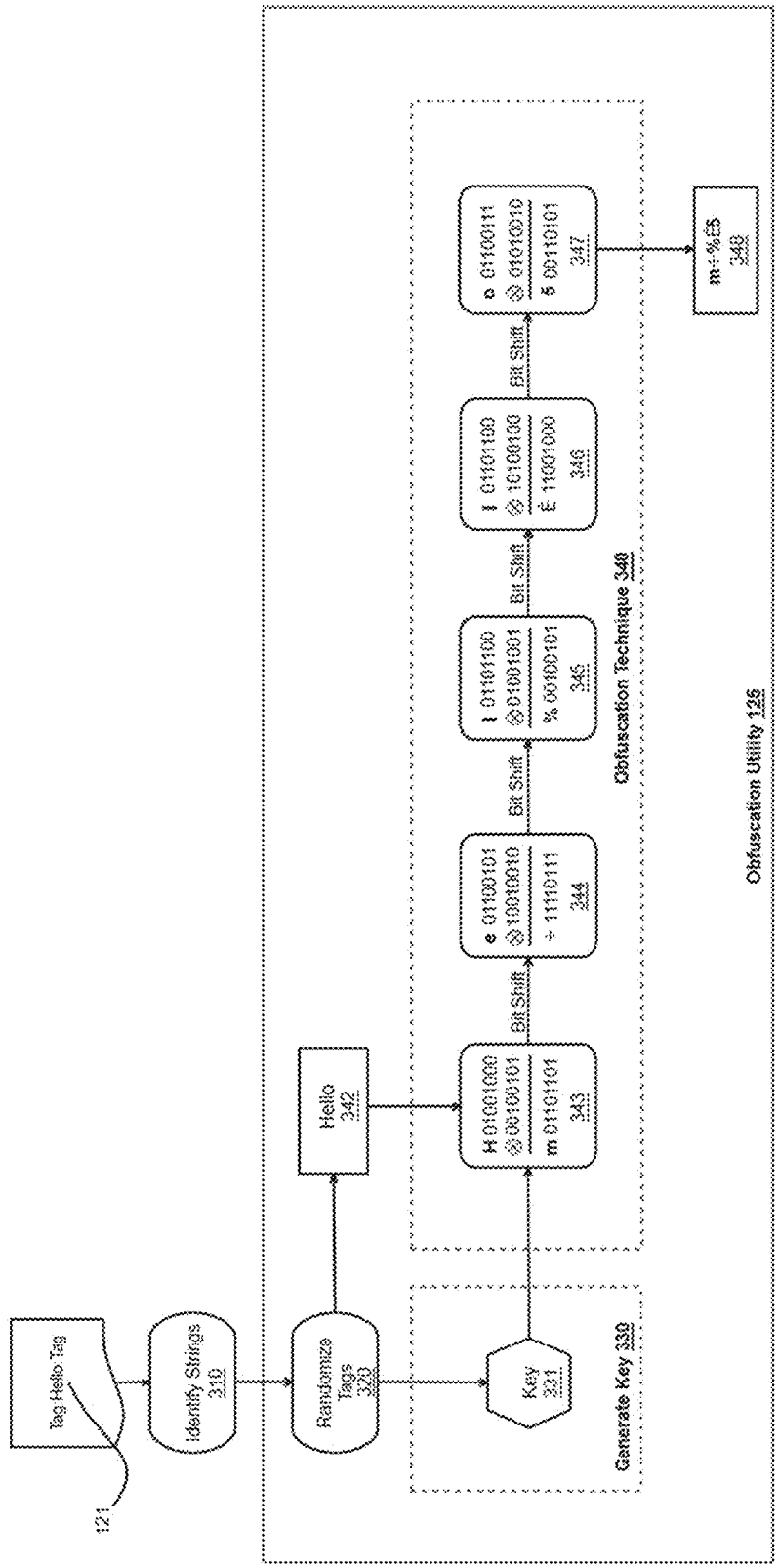
FIG. 3B illustrates an embodiment of an obfuscation process.

FIG. 3A and FIG. 3B are diagrams of example embodiments illustrating actions performed by an example obfuscation utility, and one example obfuscation technique. FIG. 3A is a block diagram of an embodiment of the present disclosure illustrating the steps of the obfuscation process within the obfuscation utility 125. The steps need not necessarily be performed in order. For example, generating an initial seed value for obfuscation in block 330 could be performed before identifying a string in block 310.

With respect to FIG. 3A, an obfuscation utility 125 may perform the following steps to obfuscate a tagged string 131. In one embodiment, the obfuscation utility 300 scans compiled binaries 120 containing a tagged string 121. The obfuscation utility 300 may detect a tagged string 121 by comparing a set of scanned character values to the obfuscation tags. The set of scanned character values compared is relative in length to the beginning obfuscation tag. For example, if the obfuscation tag is 10 characters long, the obfuscation utility 125 scans the compiled binaries for a series of 10 characters that are identical to the beginning obfuscation tag. If a matched is found, then the string to be obfuscated is identified as the proceeding text data characters (block 310). In some embodiments, the obfuscation utility may determine the length of a tagged string 121 by comparing a set scanned character values to the end obfuscation tag after the beginning obfuscation tag for a tagged string is identified. For example, if the end obfuscation tag is 10 characters long, the obfuscation utility 125 scans the proceeding text data after identifying a tagged string in compiled binaries for a series of 10 characters that are identical to the ending obfuscation tag. If a matched is found, then the length of string to be obfuscated (scope of obfuscation) can be determined by removing the lengths of the obfuscation tags (block 310).

In some embodiments, the identified obfuscation tags (at 310) may be randomized into lower 1-128 ASCII characters (at 320). The randomized obfuscation tags can be used in the generation of a two way XOR key (at 330), such that the byte value of any of the obfuscated characters in either obfuscation tag is used as an obfuscation key. In some embodiments, a combination of bit values from the byte values of obfuscated characters in either obfuscation tag can be used to determine an obfuscation key. For example, the last bit value of every obfuscated character in both obfuscation tags may be used to create an obfuscation key. To further increase the measure of preventive security in a binary file, an obfuscation key is subject to bit shifting after the obfuscation of each character value (at 340) in its respective string. By using a lower ASCII (7 bit) character as a byte (8 bit) length cipher key that is subject to bit shifting when obfuscating text data, a more seemingly random cipher is produced by alternating, based on the current bit shifted state of obfuscation key and the bit value text data character to be obfuscated, extended ASCII (8 bit) characters written to the obfuscated binaries 130. Using randomly generated lower ASCII characters is one example of implementing a bit value to an obfuscation key. For instance, Unicode characters (e.g., UTF-32, UTF-8) may be used to assign a bit value to an obfuscation key, which in turn may be used for ciphering text data into various character code formats (e.g., UTF-7, ASCII, ANSI, and the like). Similarly, any character code format may be used, by a random or any other selective process, to assign a bit value to an obfuscation key.

In some embodiments, a key is generated for each tagged string in a binary file. This results in the obfuscation utility 125 writing (at 350) obfuscated text data, to binary files 130, that each require a unique byte key to be deciphered. A developer may wish to utilize a unique cipher key for each obfuscated text data value in compiled binaries to deter computer hackers from deciphering binary code, as each character would require a substantial amount of effort to decipher and each key discovery could only decipher its respective string.

A. Obfuscation Technique

FIG. 3B provides an example embodiment for executing an obfuscation technique, such as in Block 340 in FIG. 3A. In some embodiments, identifying (at 310) a tagged string occurs as a read operation of compiled binaries 120. The randomizing of obfuscation tags (at 320) occurs as a write operation that transforms the text data value of the obfuscation tags in a string 112. A developer may wish to randomize obfuscation tags in this manner to preserve the size and length of the binary file, as opposed to removing the obfuscation tags or modifying their length in the process. The key generation 330 may use the first byte of the newly obfuscated tags as the key for obfuscating the string surrounded by the tags. A developer can devote the first bye of the beginning tag, in obfuscated form, as a two way cipher key for each tagged string so as to incorporate each key (for obfuscation and de-obfuscation) uniformly within the obfuscated binary 130 itself; though any obfuscated character byte from either obfuscated tag may be used as the cipher key. Furthermore, incorporating two way keys into the obfuscated binaries masks the keys amongst other obfuscated characters and eliminates the need for storing keys elsewhere, thus reducing binary file sizes. If, for example, a computer hacker were to solve the ciphering algorithm, the binary files could then be easily de-obfuscated. However, this would require a significant amount of effort on the hacker behalf, more so than they may wish to attempt from a first glance or simple scan of the binary files, which is why, though solvable, the automated static string obfuscation is effective at deterring intrusion In some embodiments, such as the one illustrated in FIG. 3B, the obfuscation key 331 used to generate an obfuscated string is circularly bit shifted after each character is obfuscated within the string. A developer may wish to implement circular bit shifted two way ciphering to preserve the bit order of obfuscated strings, which in turn allows for fundamental operations (e.g. sorting, matching, and the like) over obfuscated data to be performed efficiently during runtime.

In box 343, the XOR operation between the generated key 331 and the first letter of the initial string literal "H" is performed. In the example obfuscation technique illustrated, the bit value of "H" undergoes an XOR operation with the bit value of the generated key, which yields an obfuscated bit value of "01101101" otherwise known, in ASCII, as the letter "m". After generating the first obfuscated character value "m" 343, the XOR key 331 is circularly bit shifted to the right and undergoes an XOR operation with the proceeding string literal value "e" 344, yielding an obfuscated bit value of "11110111" otherwise known as "÷" in ASCII. After generating the second obfuscated character 344, the XOR key 331 is circularly bit shifted to the right, and the obfuscation technique is performed again on the next character with the shifted key. This technique continues on for each character value within the string literal 342 until the final character value in the string literal is reached.

In some embodiments, the obfuscation utility 300 may then combine all generated obfuscated characters into an obfuscated string literal 348. The obfuscated string 348, and the randomized tags, may be written directly over the unobfuscated string and its tags in the unobfuscated binary, thus altering the binary to obfuscate the string. In some embodiments, the XOR operation is a symmetrical cipher that utilizes the initial two way key for runtime de-obfuscation.

Symmetrical XOR ciphering with a two way key is one example of a symmetrical ciphering algorithm that can be used to obfuscate data values. For instance, the Beaufort cipher may be used to obfuscate data values as its deciphering algorithm is a reciprocal cipher that can be provided to compiled binaries to de-obfuscate data values at runtime. Another example of a symmetrical cipher that can be used to obfuscate data values is the Vigenère cipher, as its predetermined cipher keys are also used for deciphering, which can be provided to the compiled binaries to de-obfuscate data values at runtime. It is to be noted that any ciphering algorithm can be used for obfuscating data values, such that a method and/or key for deciphering obfuscated data be provided to compiled binaries for runtime de-obfuscation.

IV. Runtime

Figure 4:
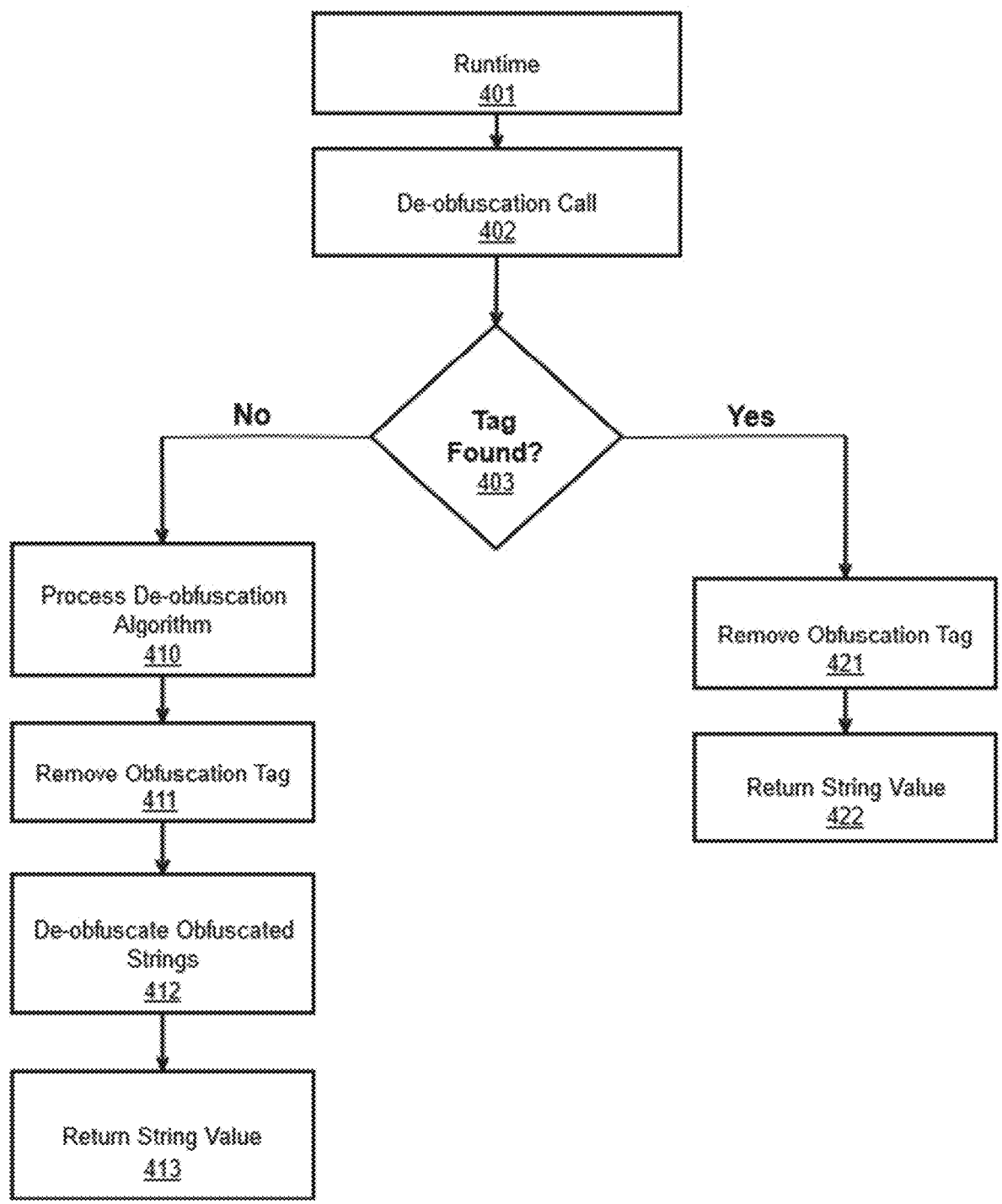
FIG. 4 illustrates an embodiment of a de-obfuscation process that may occur during user and development runtime.

FIG. 4 illustrates a block diagram of the de-obfuscation process that occurs during runtime. The de-obfuscation algorithm, within the de-obfuscation call, may determine whether a string is in an obfuscated or de-obfuscated state. For example, the de-obfuscation call may detect unobfuscated (or unrandomized) versions of the tags so that the de-obfuscation call can return the string directly after stripping the tags. If the unobfuscated (or unrandomized) versions of the tags were not detected, the de-obfuscation call can de-obfuscate the string. Thus, any binary using the embodiments described herein may need to function regardless of whether or not the tags have been obfuscated yet.

The exemplary embodiment shown in FIG. 4 is one method for returning a desired string regardless of whether a tagged string has been obfuscated or not. Compiled binary files, such as 120,130,140, may possess calls to return tagged strings for de-obfuscation, as well as the algorithm required to perform de-obfuscation on obfuscated strings. The return of tagged strings may be implemented by having the macro insert a de-obfuscation call 402 where the string is referenced in the source code of the program. The de-obfuscation call 402 may determine in Block 403 if a return tagged string is obfuscated by comparing the first set of return characters, relative to the length of obfuscation start tag, to the string literal that composes the starting obfuscation tag. If an obfuscation tag is found, such as in the case of a developer runtime binary prior to obfuscation, the obfuscation tag(s) are removed 421 and the initial string value is returned 422. If an un-obfuscated tag is not found, it is assumed that the tag has been randomized, and the string itself is obfuscated. In that case, the de-obfuscation algorithm is processed 410 removing the obfuscated tags from the tagged string 411, de-obfuscating the obfuscated string value 412, and returning the initial string value 413.

In some embodiments, de-obfuscation is performed by a circularly bit shifted symmetrical XOR operation. The key used to decipher the obfuscated string is provided within the string returned by the de-obfuscation call, such as the byte comprising the first obfuscated character of the obfuscation tag. Once the key has been retrieved, the obfuscation tags, identifiable to the de-obfuscation algorithm by their length and respective positions, may be omitted from the de-obfuscation process so as to return only the initial string value 413. The first character of the obfuscated string value 412 undergoes an XOR operation with the retrieved obfuscation key to decipher its initial character value. After the first character value has been deciphered, the obfuscation key is circularly bit shifted to the right and utilized in an XOR operation to decipher the second obfuscated character. Similarly, the obfuscation key is bit shifted to the right after each character in the obfuscated string is deciphered.

V. User Environment

Figure 5:
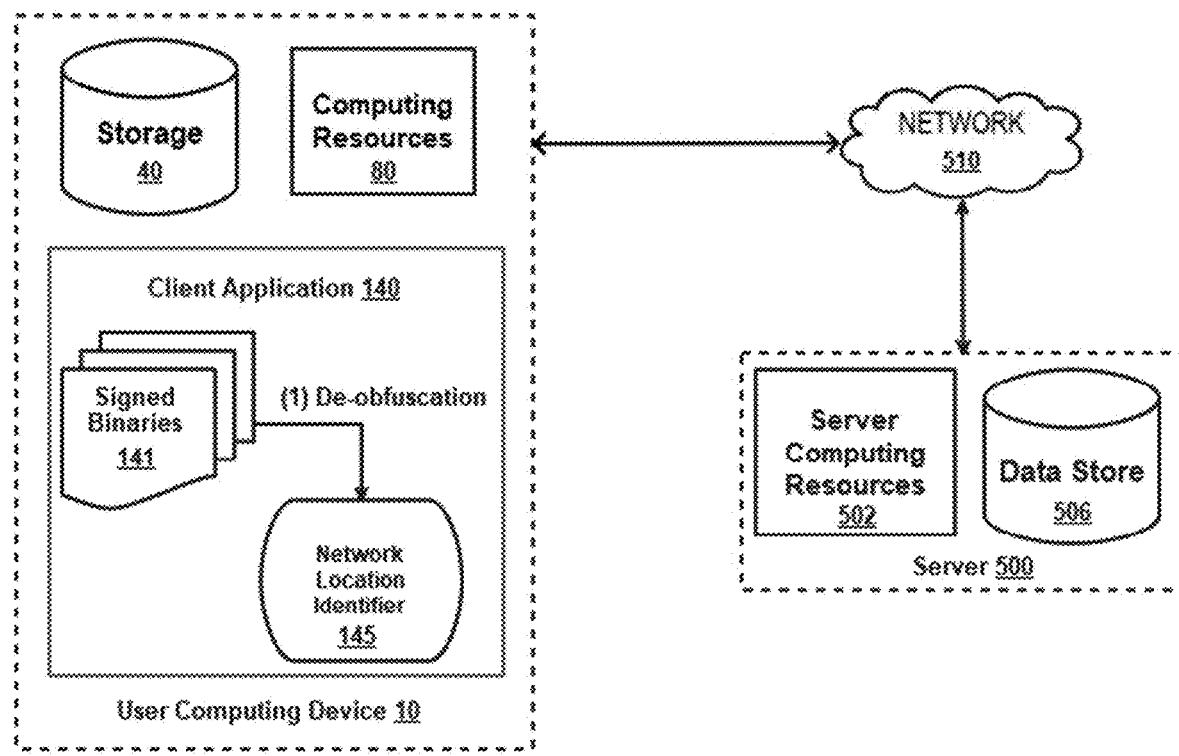
FIG. 5 illustrates an embodiment of a preferred computing environment executing a client with signed obfuscated binary files.

FIG. 5 illustrates a preferred embodiment of a computing environment implementing static string de-obfuscation. The environment includes a network 510 and a computing device 10 running a client 140 containing signed binary files 141 that contain strings defining network location identifiers 145 to a plurality of servers 500. Advantageously, the network location identifiers 145 within the binary files 141 may be stored as obfuscated strings to prevent easy discovery by malicious users. At runtime, when the client 140 is to complete a service connection, a de-obfuscation call is made to de-obfuscate the network location identifier (at 1). The obfuscated string is then stripped of its obfuscation tags and de-obfuscated to provide the client 140 with the network location identifier. The computing device 10 uses the network location identifier to connect to a server 500. To simplify discussion and not limit to the present disclosure, FIG. 5 illustrates only a single computing device running a single client application with a single obfuscation utility over a single network to one or more of servers, though multiple systems and distinct and/or distributed networks may be used.

VI. Overview of Computing Device

Figure 6:
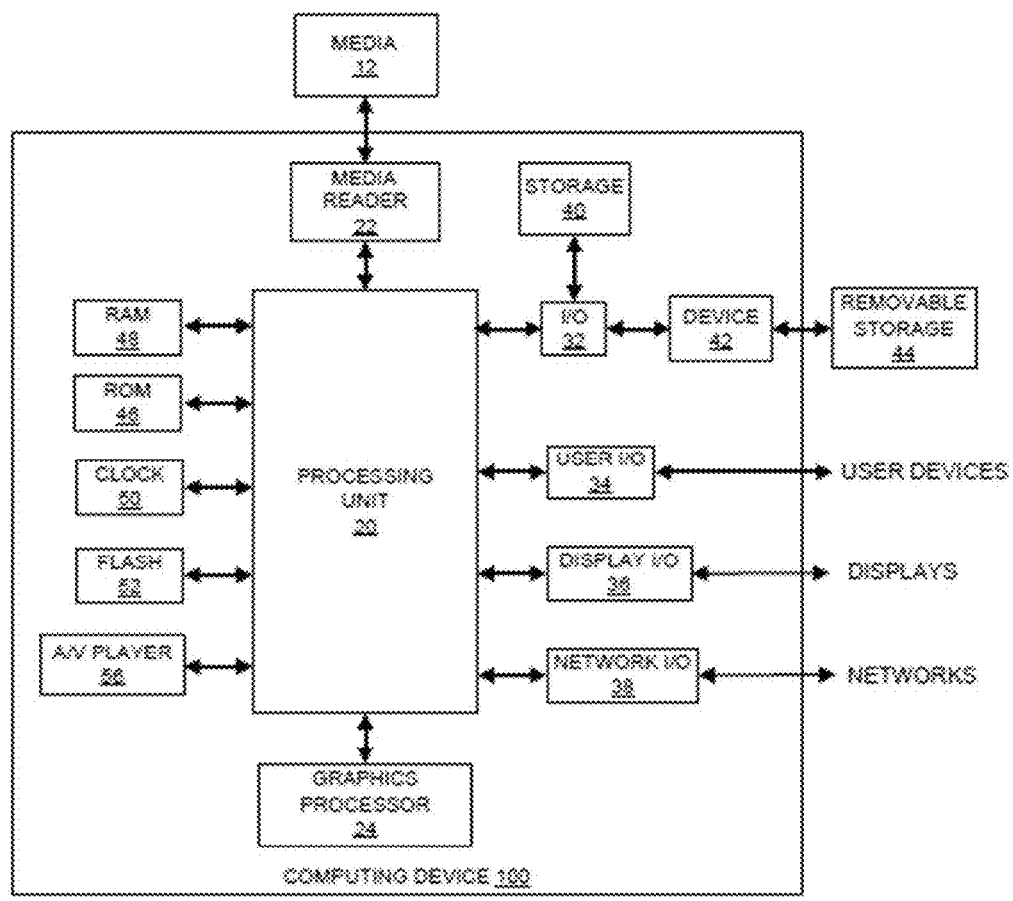
FIG. 6 illustrates an embodiment of a computing device.

FIG. 6 illustrates an embodiment of computing device 10 according to the present disclosure. Other variations of the computing device 10 may be substituted for the examples explicitly presented herein, such as removing or adding components to the computing device 10. The computing device 10 may include a game device, a smart phone, a tablet, a personal computer, a laptop, a smart television, a car console display, a server, and the like. As shown, the computing device 10 includes a processing unit 20 that interacts with other components of the computing device 100 and also external components to computing device 10. A media reader 22 is included that communicates with media 12. The media reader 22 may be an optical disc reader capable of reading optical discs, such as CD-ROM or DVDs, or any other type of reader that can receive and read data from media 12. One or more of the computing devices may be used to implement one or more of the systems disclosed herein.

Computing device 10 may include a separate graphics processor 24. In some cases, the graphics processor 24 may be built into the processing unit 20. In some such cases, the graphics processor 24 may share Random Access Memory (RAM) with the processing unit 20. Alternatively, or in addition, the computing device 10 may include a discrete graphics processor 24 that is separate from the processing unit 20. In some such cases, the graphics processor 24 may have separate RAM from the processing unit 20. Computing device 10 might be a handheld video game device, a dedicated game console computing system, a general-purpose laptop or desktop computer, a smart phone, a tablet, a car console, or other suitable system.

Computing device 10 also includes various components for enabling input/output, such as an I/O 32, a user I/O 34, a display I/O 36, and a network I/O 38. I/O 32 interacts with storage element 40 and, through a device 42, removable storage media 44 in order to provide storage for computing device 10. Processing unit 20 can communicate through I/O 32 to store data. In addition to storage 40 and removable storage media 44, computing device 10 is also shown including ROM (Read-Only Memory) 46 and RAM 48. RAM 48 may be used for data that is accessed frequently.

User I/O 34 is used to send and receive commands between processing unit 20 and user devices, such as keyboards or game controllers. In some embodiments, the user I/O can include a touchscreen inputs. The touchscreen can be capacitive touchscreen, a resistive touchscreen, or other type of touchscreen technology that is configured to receive user input through tactile inputs from the user. Display I/O 36 provides input/output functions that are used to display images. Network I/O 38 is used for input/output functions for a network. Network I/O 38 may be used during execution, such as when a client is connecting to a server over a network.

Display output signals produced by display I/O 36 comprising signals for displaying visual content produced by computing device 10 on a display device, such as graphics, user interfaces, video, and/or other visual content. Computing device 10 may comprise one or more integrated displays configured to receive display output signals produced by display I/O 36. According to some embodiments, display output signals produced by display I/O 36 may also be output to one or more display devices external to computing device 10, such a display 16.

The computing device 10 can also include other features, such as a clock 50, flash memory 52, and other components. An audio/video player 56 might also be used to play a video sequence, such as a movie. It should be understood that other components may be provided in computing device 10 and that a person skilled in the art will appreciate other variations of computing device 10.

Program code can be stored in ROM 46, RAM 48 or storage 40 (which might comprise hard disk, other magnetic storage, optical storage, other non-volatile storage or a combination or variation of these). Part of the program code can be stored in ROM that is programmable (ROM, PROM, EPROM, EEPROM, and so forth), part of the program code can be stored in storage 40, and/or on removable media such as media 12 (which can be a CD-ROM, cartridge, memory chip or the like, or obtained over a network or other electronic channel as needed). In general, program code can be found embodied in a tangible non-transitory signal-bearing medium.

Random access memory (RAM) 48 (and possibly other storage) is usable to store variables and other processor data as needed. RAM is used and holds data that is generated during the execution of an application and portions thereof might also be reserved for frame buffers, application state information, and/or other data needed or usable for interpreting user input and generating display outputs. Generally, RAM 48 is volatile storage and data stored within RAM 48 may be lost when the computing device 10 is turned off or loses power.

As computing device 10 reads media 12 and provides an application, information may be read from media 12 and stored in a memory device, such as RAM 48. Additionally, data from storage 40, ROM 46, servers accessed via a network (not shown), or removable storage media 46 may be read and loaded into RAM 48. Although data is described as being found in RAM 48, it will be understood that data does not have to be stored in RAM 48 and may be stored in other memory accessible to processing unit 20 or distributed among several media, such as media 12 and storage 40.

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

All of the processes described herein may be embodied in, and fully automated via, software code modules executed by a computing system that includes one or more computers or processors. The code modules may be stored in any type of non-transitory computer-readable medium or other computer storage device. Some or all the methods may be embodied in specialized computer hardware.

Many other variations than those described herein will be apparent from this disclosure. For example, depending on the embodiment, certain acts, events, or functions of any of the algorithms described herein can be performed in a different sequence, can be added, merged, or left out altogether (for example, not all described acts or events are necessary for the practice of the algorithms). Moreover, in certain embodiments, acts or events can be performed concurrently, for example, through multi-threaded processing, interrupt processing, or multiple processors or processor cores or on other parallel architectures, rather than sequentially. In addition, different tasks or processes can be performed by different machines and/or computing systems that can function together.

The various illustrative logical blocks and modules described in connection with the embodiments disclosed herein can be implemented or performed by a machine, such as a processing unit or processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor can be a microprocessor, but in the alternative, the processor can be a controller, microcontroller, or state machine, combinations of the same, or the like. A processor can include electrical circuitry configured to process computer-executable instructions. In another embodiment, a processor includes an FPGA or other programmable device that performs logic operations without processing computer-executable instructions. A processor can also be implemented as a combination of computing devices, for example, a combination of a DSP and a microprocessor, a plurality of microprocessors, one or more microprocessors in conjunction with a DSP core, or any other such configuration. Although described herein primarily with respect to digital technology, a processor may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

Conditional language such as, among others, "can," "could," "might" or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," unless specifically stated otherwise, is otherwise understood with the context as used in general to present that an item, term, etc., may be either X, Y, or Z, or any combination thereof (for example, X, Y, and/or Z). Thus, such disjunctive language is not generally intended to, and should not, imply that certain embodiments require at least one of X, at least one of Y, or at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

It should be emphasized that many variations and modifications may be made to the above-described embodiments, the elements of which are to be understood as being among other acceptable examples. All such modifications and variations are intended to be included herein within the scope of this disclosure.

What is claimed is:
1. A system, comprising:
 a memory;
 a processor in communication with the memory, the processor configured to:
  execute an obfuscation macro to insert, into a source code comprising a data value, obfuscation identification information concatenated to the data value and a runtime de-obfuscation function call associated with the data value;

compile the source code into a binary code, wherein the binary code comprises the data value in an unobfuscated form;

identify, in the binary code, the obfuscation identification information comprising an obfuscation tag;

produce, based on the obfuscation identification information, an obfuscation key, wherein the obfuscation key comprises at least part of the obfuscation tag; and iteratively obfuscate, using the obfuscation key, each byte of a plurality of bytes of the data value, wherein the obfuscation key is circularly shifted by a predetermined number of bits after obfuscating each byte of the plurality of bytes.

2. The system of claim 1, wherein the obfuscation identification information comprises one or more text tags.

3. The system of claim 1, wherein the obfuscation macro is a preprocessor directive.

4. The system of claim 1, wherein the data value is a static string.

5. The system of claim 1, wherein the processor is further configured to digitally sign the binary code.

6. The system of claim 1, wherein the processor is further configured to execute the de-obfuscation function to restore the data value in the unobfuscated form.

7. A method, comprising:

executing, by a processor, an obfuscation macro to insert, into a source code comprising a data value, obfuscation identification information concatenated to the data value and a runtime de-obfuscation function call associated with the data value;

compiling, by the processor, the source code into a binary code, wherein the binary code comprises the data value in an unobfuscated form;

identifying, in the binary code, the obfuscation identification information comprising an obfuscation tag;

producing, based on the obfuscation identification information, an obfuscation key, wherein the obfuscation key comprises at least part of the obfuscation tag; and iteratively obfuscating, using the obfuscation key, each byte of a plurality of bytes of the data value, wherein the obfuscation key is circularly shifted by a predetermined number of bits after obfuscating each byte of the plurality of bytes.

8. The method of claim 7, wherein the obfuscation identification information comprises one or more text tags.

9. The method of claim 7, wherein the obfuscation macro is a preprocessor directive.

10. The method of claim 7, wherein the data value is a static string.

11. The method of claim 7, wherein producing the obfuscation key further comprises randomly obfuscating the obfuscation identification information.

12. A non-transitory computer-readable storage medium containing executable instructions which, when executed by a processing device, cause the processing device to:

execute an obfuscation macro to insert, into a source code comprising a data value, obfuscation identification information concatenated to the data value and a runtime de-obfuscation function call associated with the data value;

compile the source code into a binary code, wherein the binary code comprises the data value in an unobfuscated form;

identify, in the binary code, the obfuscation identification information comprising an obfuscation tag;

produce, based on the obfuscation identification information, an obfuscation key, wherein the obfuscation key comprises at least part of the obfuscation tag; and iteratively obfuscate, using the obfuscation key, each byte of a plurality of bytes of the data value, wherein the obfuscation key is circularly shifted by a predetermined number of bits after obfuscating each byte of the plurality of bytes.

13. The non-transitory computer-readable storage medium of claim 12, wherein the obfuscation identification information comprises one or more text tags.

14. The non-transitory computer-readable storage medium of claim 12, wherein the obfuscation macro is a preprocessor directive.

15. The non-transitory computer-readable storage medium of claim 12, wherein the data value is a static string.

16. The non-transitory computer-readable storage medium of claim 12, wherein producing the obfuscation key further comprises randomly obfuscating the obfuscation identification information.

17. The method of claim 7, further comprising:

executing the de-obfuscation function to restore the data value in the unobfuscated form.

18. The non-transitory computer-readable storage medium of claim 12, further comprising executable instructions which, when executed by the processing device, cause the processing device to:

execute the de-obfuscation function to restore the data value in the unobfuscated form.

* * * * *